United States Patent
Niewiadomski et al.

(10) Patent No.: US 11,897,468 B2
(45) Date of Patent: Feb. 13, 2024

(54) VEHICLE CONTROL SYSTEM

(71) Applicant: Ford Global Technologies, LLC, Dearborn, MI (US)

(72) Inventors: Luke Niewiadomski, Dearborn, MI (US); Li Xu, Northville, MI (US); Kyle Simmons, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 830 days.

(21) Appl. No.: 16/807,738

(22) Filed: Mar. 3, 2020

(65) Prior Publication Data

US 2021/0276553 A1   Sep. 9, 2021

(51) Int. Cl.
*B60W 30/165* (2020.01)
*B60W 60/00* (2020.01)
*G06N 20/00* (2019.01)

(52) U.S. Cl.
CPC .... *B60W 30/165* (2013.01); *B60W 60/00186* (2020.02); *G06N 20/00* (2019.01)

(58) Field of Classification Search
CPC ......... B60W 30/165; B60W 60/00186; B60W 2420/42; B60W 30/095; B60W 30/0953; B60W 30/0956; B60W 60/00; B60W 30/06; B60W 50/0097; B60W 50/14; B60W 30/09; B60W 2050/146; B60W 2554/00; B60W 2710/18; B60W 30/18154; G06N 20/00; G06N 3/0454; G06N 3/08; G01S 17/931; G08G 1/166; G05B 13/026; G05B 13/0265; G06T 7/97; G06T 2207/20081; G06T 2207/30236; G06T 2207/30242; G06T 2207/30256; G06T 2207/10016; G06T 2207/20084; G06T 2207/30252; G06T 7/70; G01C 21/3492; G01C 21/365; G01C 21/3691

See application file for complete search history.

(56) References Cited

U.S. PATENT DOCUMENTS

| 9,457,808 B2 | 10/2016 | Raisch et al. | |
| 10,239,452 B1 * | 3/2019 | Szczepaniak | B60W 50/14 |
| 10,762,786 B1 * | 9/2020 | Dewey | B60W 30/0956 |
| 11,209,821 B2 * | 12/2021 | Valois | G06N 20/00 |

(Continued)

FOREIGN PATENT DOCUMENTS

| DE | 102009029456 A1 | 3/2011 |
| JP | 2017165180 A * | 9/2017 |

OTHER PUBLICATIONS

Obayashi Mikio, Mar. 15, 2016, English Machine Translation_JP 2017/165180 A provided by Patent Translate by EPO and Google (Year: 2016).*

*Primary Examiner* — Peter D Nolan
*Assistant Examiner* — Ashley L Redhead, Jr.
(74) *Attorney, Agent, or Firm* — Frank A. MacKenzie; Bejin Bieneman PLC

(57) ABSTRACT

While operating a host vehicle in an area, a target vehicle is identified in a sub-area based on detecting a visual cue from the target vehicle. A future location of the target vehicle is predicted to intersect a path of the host vehicle. A stop position of the host vehicle is determined based on the future location of the target vehicle. At least one of the target vehicle is determined to have moved or the path of the host vehicle is updated. Then, the host vehicle is operated to the stop position or along the updated path.

18 Claims, 8 Drawing Sheets

(56) References Cited

U.S. PATENT DOCUMENTS

| | | | | |
|---|---|---|---|---|
| 2004/0114381 A1* | 6/2004 | Salmeen | B60Q 1/085 | 362/465 |
| 2005/0035879 A1* | 2/2005 | Gotzig | B60Q 9/006 | 340/932.2 |
| 2011/0178710 A1* | 7/2011 | Pilutti | B60K 31/0008 | 701/301 |
| 2013/0030651 A1* | 1/2013 | Moshchuk | B60W 30/09 | 701/41 |
| 2015/0179075 A1* | 6/2015 | Lee | G08G 1/165 | 340/932.2 |
| 2016/0075326 A1* | 3/2016 | Kiyokawa | B62D 15/0285 | 701/41 |
| 2017/0203757 A1* | 7/2017 | Ohbayashi | B62D 15/027 | |
| 2017/0355307 A1* | 12/2017 | Ha | G08G 1/143 | |
| 2018/0093663 A1 | 4/2018 | Kim et al. | | |
| 2018/0136652 A1* | 5/2018 | Jiang | G05D 1/0088 | |
| 2018/0307237 A1* | 10/2018 | Ji | B60W 30/0956 | |
| 2018/0308360 A1* | 10/2018 | Regmi | G08G 1/162 | |
| 2018/0374345 A1* | 12/2018 | Suzuki | G08G 1/04 | |
| 2019/0012920 A1* | 1/2019 | Tamura | B60W 30/09 | |
| 2020/0074862 A1* | 3/2020 | Johnston | G08G 1/22 | |
| 2020/0074863 A1* | 3/2020 | Jung | G01S 13/867 | |
| 2020/0086854 A1* | 3/2020 | Liu | B60W 30/0956 | |
| 2020/0124719 A1* | 4/2020 | Noujeim | G01S 13/751 | |
| 2020/0133288 A1* | 4/2020 | Abari | G05D 1/0088 | |
| 2020/0278694 A1* | 9/2020 | Umeda | H04W 4/029 | |
| 2020/0398833 A1* | 12/2020 | Hudecek | B60W 60/001 | |
| 2020/0398894 A1* | 12/2020 | Hudecek | G05D 1/0214 | |
| 2021/0001844 A1* | 1/2021 | Perincherry | G05B 13/026 | |
| 2021/0053561 A1* | 2/2021 | Beller | G08G 1/166 | |
| 2021/0245762 A1* | 8/2021 | Tsuru | G08G 1/16 | |
| 2022/0073090 A1* | 3/2022 | Kakeshita | B60W 50/14 | |
| 2022/0227420 A1* | 7/2022 | Shimanaka | G06V 20/584 | |
| 2022/0258730 A1* | 8/2022 | Morotomi | B60W 30/0956 | |
| 2022/0383745 A1* | 12/2022 | Heilbron | G06V 20/582 | |
| 2023/0031053 A1* | 2/2023 | Kodama | B62D 6/00 | |
| 2023/0037767 A1* | 2/2023 | Yang | B60W 30/0956 | |

\* cited by examiner

VEHICLE CONTROL SYSTEM

BACKGROUND

A vehicle can be equipped with electronic and electro-mechanical components, e.g., computing devices, networks, sensors and controllers, etc. A vehicle computer can acquire data regarding the vehicle's environment and can operate the vehicle or at least some components thereof based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated.

DETAILED DESCRIPTION

Figure 1:
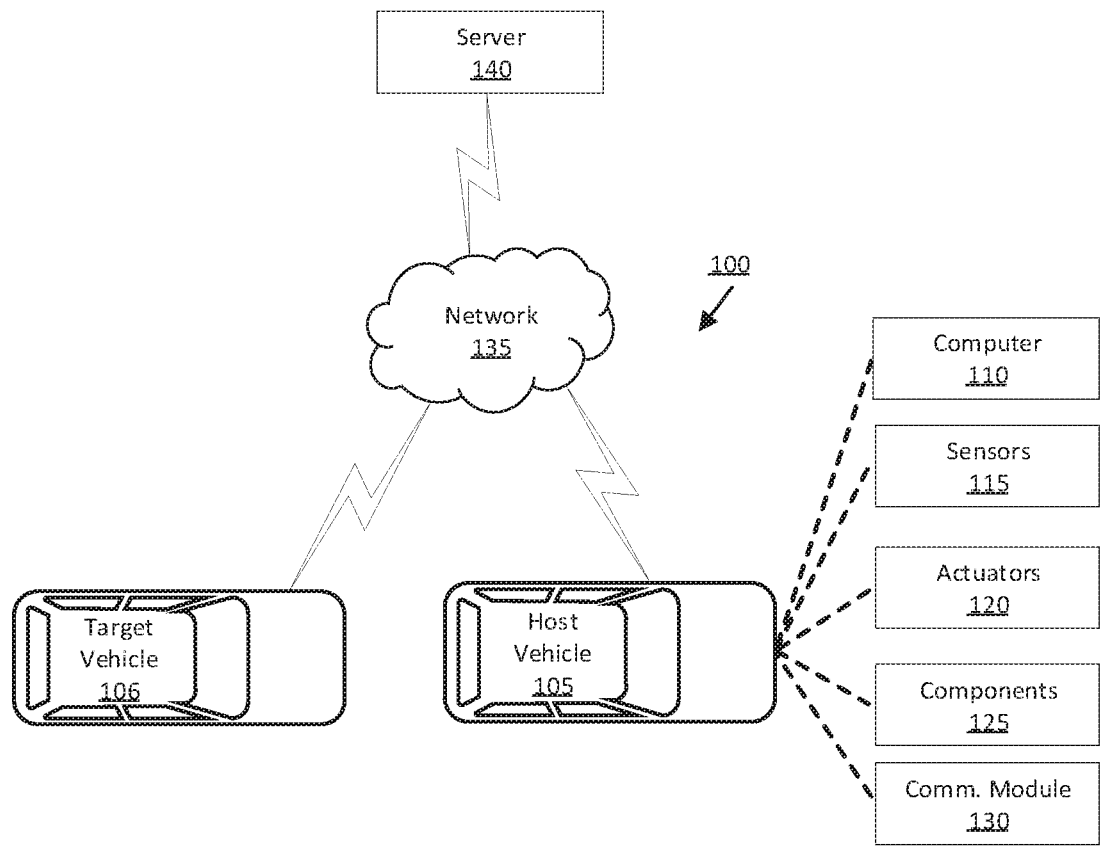
FIG. 1 is a block diagram illustrating an example vehicle control system for a host vehicle.

A system includes a computer including a processor and a memory, the memory storing instructions executable by the processor to, while operating a host vehicle in an area, identify a target vehicle in a sub-area based on detecting a visual cue from the target vehicle. The instructions further include instructions to predict that a future location of the target vehicle and a path of the host vehicle will intersect. The instructions further include instructions to determine a stop position of the host vehicle based on the future location of the target vehicle. The instructions further include instructions to at least one of (a) determine that the target vehicle has moved, or (b) update the path of the host vehicle. The instructions further include instructions to then, operate the host vehicle to the stop position or along the updated path.

The instructions can further include instructions to identify the target vehicle based further on the target vehicle being within a first distance of the host vehicle.

The instructions can further include instructions to operate the host vehicle along the path based on the target vehicle being within a second distance of the host vehicle. The second distance is less than the first distance.

The instructions can further include instructions to, upon determining that the target vehicle has stopped, operate the host vehicle along the updated path based on detecting the target vehicle remains stopped after a passage of a specified time.

The instructions can further include instructions to determine the specified time based on a distance between the stopped target vehicle and the host vehicle.

The instructions can further include instructions to, upon identifying the target vehicle, operate the host vehicle at a speed below a threshold.

The instructions can further include instructions to input host vehicle sensor data into a machine learning program that is programmed to output an identification of the target vehicle.

The future location may be defined in part by a path of the target vehicle.

The instructions can further include instructions to predict the path of the target vehicle based on a travel direction of the target vehicle and a turning direction of the target vehicle.

The instructions can further include instructions to determine the travel direction of the target vehicle based on identifying one of headlamps or taillights of the target vehicle via sensor data.

The instructions can further include instructions to determine the turning direction of the target vehicle based on detecting actuation of one or more target vehicle components.

The instructions can further include instructions to determine the turning direction of the target vehicle based on determining an angle between a longitudinal axis of the host vehicle and a longitudinal axis of the target vehicle.

The instructions can further include instructions to determine the stop position based on a distance from the stop position to the future location being equal to or greater than a specified distance.

The instructions can further include instructions to update the path of the host vehicle based on a lateral distance from the host vehicle to an object being greater than a specified distance, the host vehicle is between the target vehicle and the object.

The visual cue may be output by at least one of headlamps, taillights, back-up lights, and a turn signal.

A method includes, while operating a host vehicle in an area, identifying a target vehicle in a sub-area based on detecting a visual cue from the target vehicle. The method further includes predicting that a future location of the target vehicle and a path of the host vehicle will intersect. The method further includes determining a stop position of the host vehicle based on the future location of the target vehicle. The method further includes at least one of (a) determining that the target vehicle has moved, or (b) updating the path of the host vehicle. The method further includes then, operating the host vehicle to the stop position or along the updated path.

The method can further include identifying the target vehicle based further on the target vehicle being within a first distance of the host vehicle.

The method can further include determining the stop position based on a distance from the stop position to the future location being equal to or greater than a specified distance.

The method can further include updating the path of the host vehicle based on a lateral distance from the host vehicle to an object being greater than a specified distance, the host vehicle is between the target vehicle and the object.

The method can further include, upon determining that the target vehicle has stopped, operating the host vehicle along the updated path based on detecting the target vehicle remains stopped after a passage of a specified time.

Further disclosed herein is a computing device programmed to execute any of the above method steps. Yet further disclosed herein is a computer program product, including a computer readable medium storing instructions executable by a computer processor, to execute an of the above method steps.

With initial reference to FIGS. 1-3C, an example vehicle control system 100 includes a vehicle computer 110 programmed to, while operating a host vehicle 105 in an area 200, identify a target vehicle 106 in a sub-area 210 based on detecting a visual cue 215 from the target vehicle 106. The vehicle computer 110 is further programmed to predict that a future location of the target vehicle 106 and a path P of the host vehicle 105 will intersect. The vehicle computer 110 is further programmed to determine a stop position S of the host vehicle 105 based on the future location of the target vehicle 106. The vehicle computer 110 is further programmed to at least one of (a) determine that the target vehicle 106 has moved, or (b) update the path P of the host vehicle 105. The vehicle computer 110 is further programmed to then operate the host vehicle to the stop position S or along the updated path.

The vehicle computer 110 operates a host vehicle 105 along a path P in an area 200. While the host vehicle 105 is operating along the path P, a target vehicle 106 may depart a sub-area 210, e.g., a parking space, and move towards the path P of the host vehicle 105. The target vehicle 106 may move along a path that intersects the path P of the host vehicle 105. Typically, the host vehicle 105 and the target vehicle 106 may both stop to avoid impacting each other. Advantageously, the vehicle computer 110 can operate the host vehicle 105 to a stop position S, which can prevent the paths of the target vehicle 106 and the host vehicle 105 from intersecting and can allow the target vehicle 106 to continue moving along its path.

Turning now to FIG. 1, the host vehicle 105 includes the vehicle computer 110, sensors 115, actuators 120 to actuate various host vehicle components 125, and a vehicle communications module 130. The communications module 130 allows the vehicle computer 110 to communicate with a server 140 and/or the second vehicle 106, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate the host vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of host vehicle 105 brakes, propulsion (e.g., control of acceleration in the host vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the host vehicle 105 for monitoring and/or controlling various host vehicle components 125, e.g., a transmission controller, a brake controller, a steering controller, etc. The vehicle computer 110 is generally arranged for communications on a vehicle communication network that can include a bus in the host vehicle 105 such as a controller area network (CAN) or the like, and/or other wired and/or wireless mechanisms.

Via the vehicle 105 network, the vehicle computer 110 may transmit messages to various devices in the host vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the host vehicle 105, behind a vehicle 105 front windshield, around the host vehicle 105, etc., that provide relative locations, sizes, and shapes of objects surrounding the host vehicle 105. As another example, one or more radar sensors 115 fixed to vehicle 105 bumpers may provide data to provide locations of the objects, second vehicles 106, etc., relative to the location of the host vehicle 105. The sensors 115 may further alternatively or additionally, for example, include camera sensor(s) 115, e.g. front view, side view, etc., providing images from an area surrounding the host vehicle 105. In the context of this disclosure, an object is a physical, i.e., material, item that has mass and that can be represented by physical phenomena (e.g., light or other electromagnetic waves, or sound, etc.) detectable by sensors 115. Thus, the host vehicle 105 and the target vehicle 106, as well as other items including as discussed below, fall within the definition of "object" herein.

The vehicle computer 110 is programmed to receive data from one or more sensors 115 substantially continuously, periodically, and/or when instructed by a server 140, etc. The data may, for example, include a location of the host vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a pole, a curb, a bicycle, a tree, a shrub, etc., relative to the vehicle 105. As one example, the data may be image data of the environment around the vehicle 105. In such an example, the image data may include one or more objects in the area 200. Image data herein means digital image data, e.g., comprising pixels with intensity and color values, that can be acquired by camera sensors 115. The sensors 115 can be mounted to any suitable location in or on the host vehicle 105, e.g., on a vehicle 105 bumper, on a vehicle 105 roof, etc., to collect images of the environment around the host vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a host vehicle 105.

In the context of the present disclosure, a vehicle component 125 is one or more hardware components adapted to perform a mechanical or electro-mechanical function or operation—such as moving the host vehicle 105, slowing or stopping the vehicle 105, steering the host vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component 125 (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computer 110 may be configured for communicating via a vehicle-to-vehicle communication module 130 or interface with devices outside of the host vehicle 105, e.g., through a vehicle-to-vehicle (V2V) or vehicle-to-infrastructure (V2X) wireless communications (cellular and/or DSRC., etc.) to another vehicle, to a server 140 (typically via direct radio frequency communications), and/or (typically via the network 135) to a second vehicle. The communications module 130 could include one or more mechanisms, such as a transceiver, by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the server 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The server 140 can be a conventional computing device, i.e., including one or more processors and one or more memories, programmed to provide operations such as disclosed herein. Further, the server 140 can be accessed via the network 135, e.g., the Internet or some other wide area network.

Figure 2:
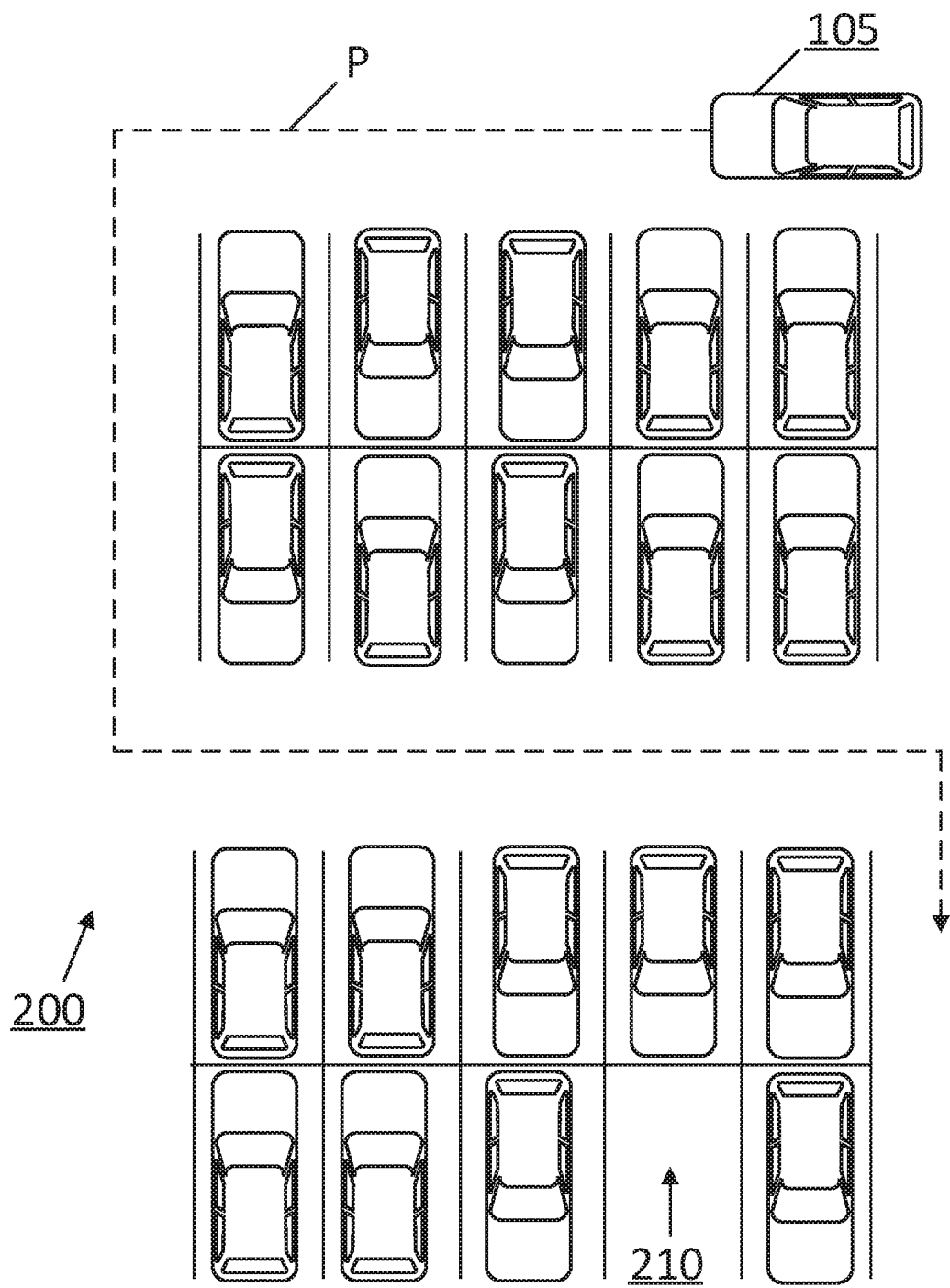
FIG. 2 is a diagram illustrating operating a host vehicle according to the system of FIG. 1.
Figure 3A:
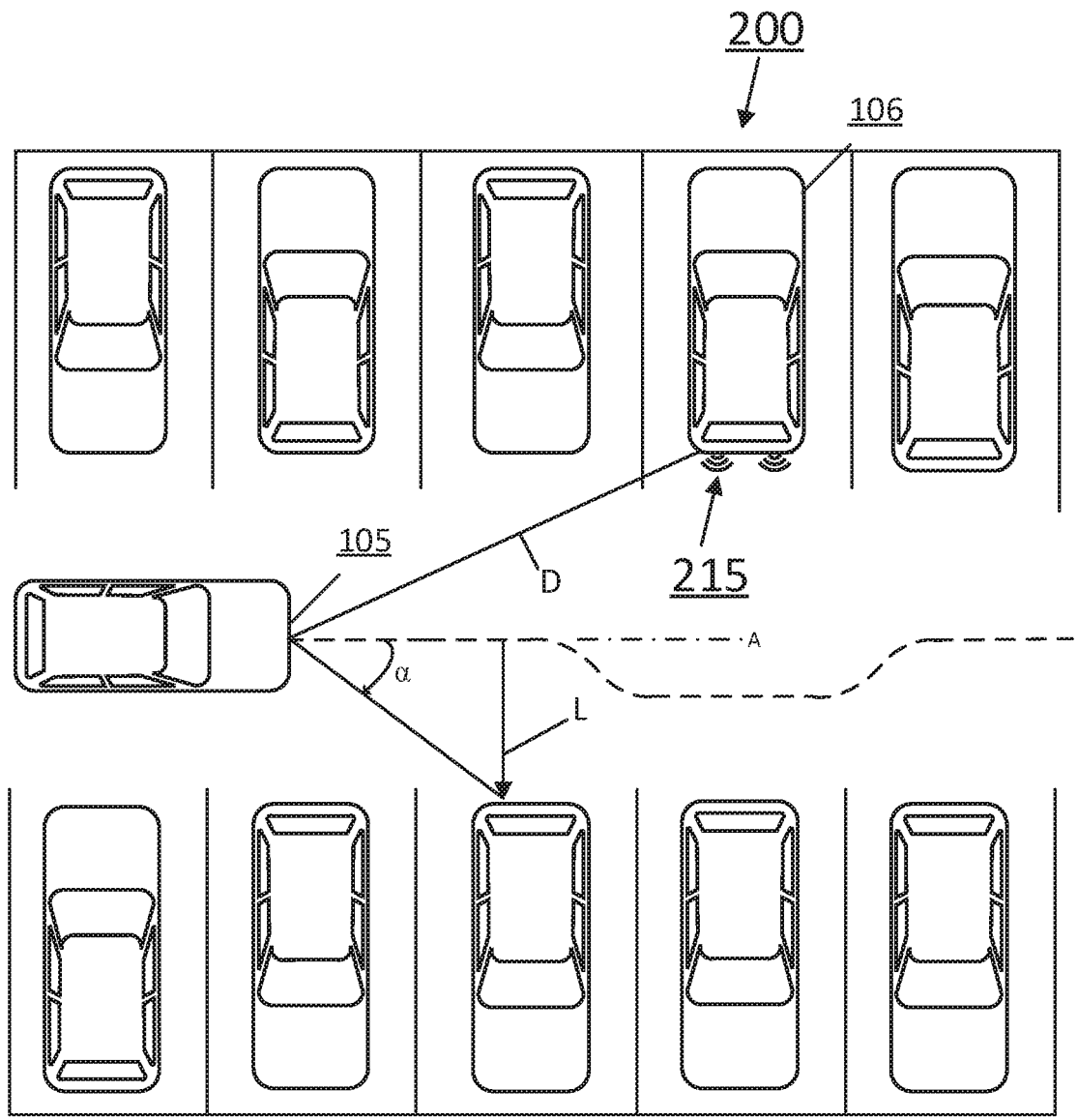
FIG. 3A is a diagram illustrating updating a path for a host vehicle based on a visual cue from a target vehicle.
Figure 3B:
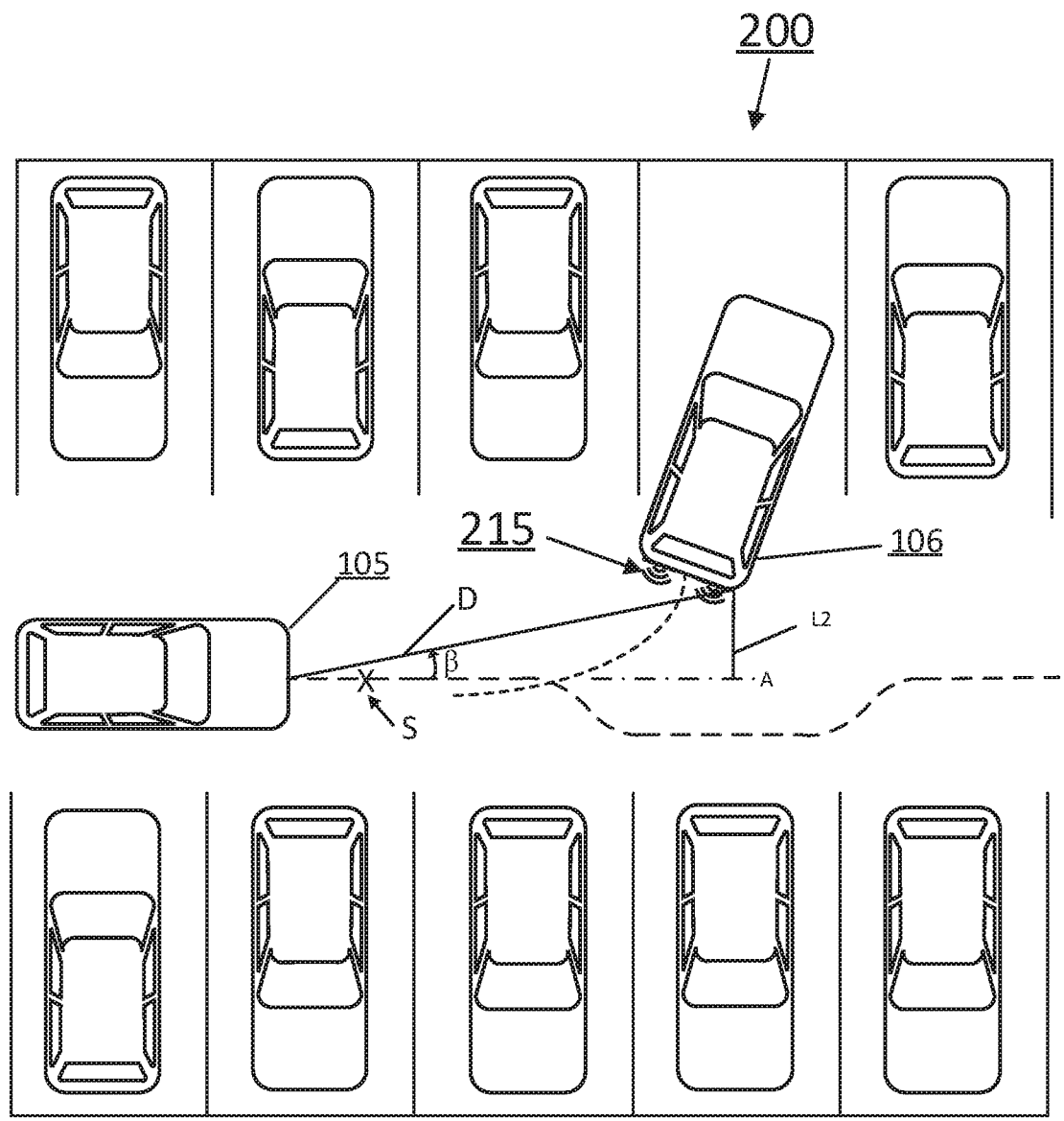
FIGS. 3B-3D are diagrams of stop positions based on a future location of the target vehicle intersecting the path of the host vehicle.
Figure 3C:
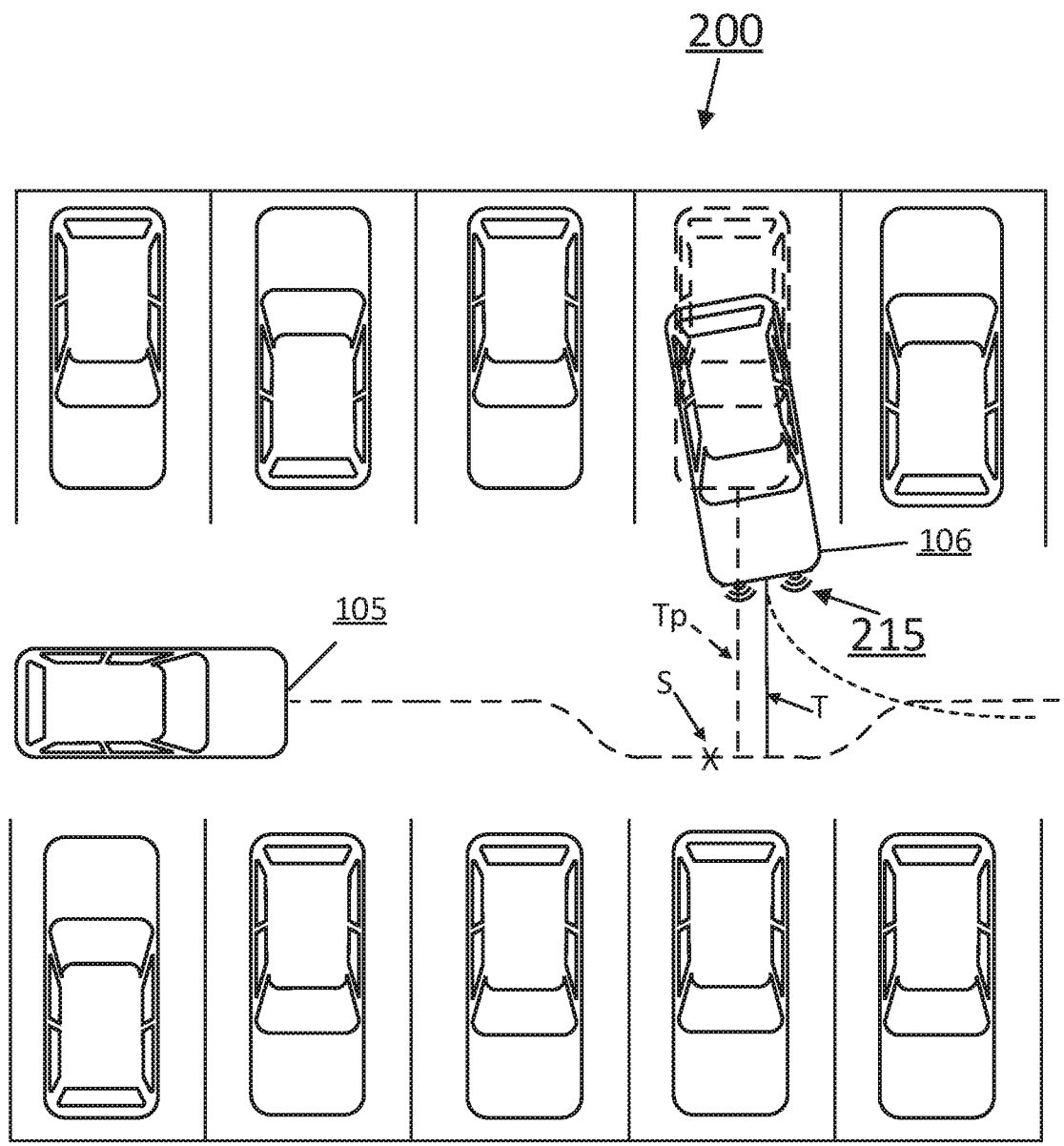
Figure 3D:
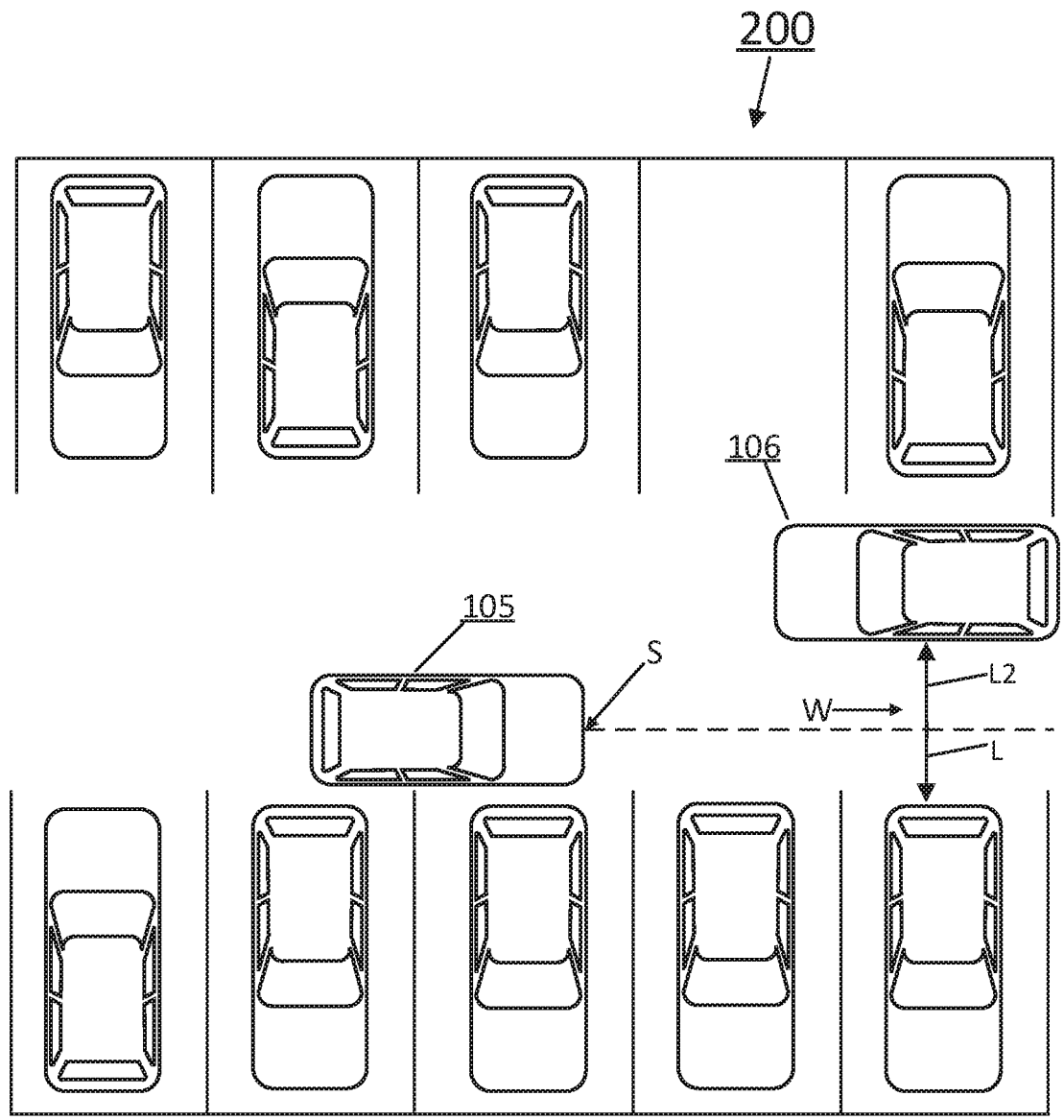

FIG. 2 is a diagram illustrating a host vehicle 105 operating in an example ground surface area 200 that includes a plurality of marked sub-areas 210 for vehicles. An area 200 may be on a street or road, e.g., alongside a curb or an edge of the street, a parking lot or structure or portion thereof, etc. The vehicle computer 110 may be programmed to determine the host vehicle 105 is within the area 200 by, e.g., GPS-based geo-fencing. In such an example, the GPS geo-fence specifies a perimeter of the area 200. The vehicle computer 110 can then determine the host vehicle 105 is within the area 200 based on the location data of the host vehicle 105 indicating the host vehicle 105 is within the geo-fence.

The vehicle computer 110 can, for example, generate a path P to operate the host vehicle 105 in the area 200. Alternatively, the server 140 can generate the path P and provide the path P to the vehicle computer 110, e.g., via the network 135. As used herein, a "path" is a set of points, e.g., that be specified as coordinates with respect to a host vehicle coordinate system and/or geo-coordinates, that the vehicle computer 110 is programmed to determine with a conventional navigation and/or path planning algorithm. A path P can be specified according to one or more path polynomials. A path polynomial is a polynomial function of degree three or less that describes the motion of a vehicle on a ground surface. Motion of a vehicle on a roadway is described by a multi-dimensional state vector that includes vehicle location, orientation speed and acceleration including positions in x, y, z, yaw, pitch, roll, yaw rate, pitch rate, roll rate, heading velocity and heading acceleration that can be determined by fitting a polynomial function to successive 2D locations included in vehicle motion vector with respect to the ground surface, for example.

The plan P can, for example, direct the host vehicle 105 along aisles or lanes along which sub-areas 210 are located in the area 200 to search for available sub-areas 210 (see FIG. 2). In such an example, the vehicle computer 110 is programmed to identify a sub-area 210 for parking the host vehicle 105 based on image data received from camera sensors 115, e.g., via the vehicle network. For example, a sub-area 210 can be a parking space indicated by markings, e.g., painted lines on a ground surface, and image recognition techniques, such as are known, can be executed by the vehicle computer 110 to identify the sub-area 210 and an available parking space.

Upon identifying a sub-area 210, the vehicle computer 110 can be programmed to determine the sub-area 210 is occupied or unoccupied based on image data. The image data includes the area 200, one or more objects in the area 200, and one or more sub-areas 210. For example, object classification or identification techniques, such as are known, can be used, e.g., in the vehicle computer 110 based on lidar sensor 115 camera sensor 115, etc., data, to identify a type of object, e.g., vehicle, person, rock, pothole, bicycle, motorcycle, etc., as well as physical features of objects.

Various techniques may be used to interpret sensor 115 data. For example, camera and/or lidar image data can be provided to a classifier that comprises programming to utilize one or more conventional image classification techniques. For example, the classifier can use a machine learning technique in which data known to represent various objects, is provided to a machine learning program for training the classifier. Once trained, the classifier can accept as input host vehicle sensor 115 data, e.g., an image, and then provide as output, for each of one or more respective regions of interest in the image, an identification of one or more objects or that no object is present in the respective region of interest. In the case that the machine learning outputs that an object is present in a region of interest, e.g., a sub-area 210, the vehicle computer 110 determines the sub-area 210 is occupied. In the case that the machine learning outputs that no object is present in a region of interest, e.g., the sub-area 210, the vehicle computer 110 determines the sub-area 210 is unoccupied.

Further, a coordinate system (e.g., polar or cartesian) applied to an area proximate to the host vehicle 105 can be applied to specify locations and/or areas (e.g., according to the host vehicle 105 coordinate system, translated to global latitude and longitude geo-coordinates, etc.) of objects identified from sensor 115 data. Yet further, the vehicle computer 110 could employ various techniques for fusing (i.e., incorporating into a common coordinate system or frame of reference) data from different sensors 115 and/or types of sensors 115, e.g., lidar, radar, and/or optical camera data.

Upon determining a sub-area 210 is occupied and identifying the object as a vehicle, the vehicle computer 110 is programmed to identify the vehicle as a target vehicle 106 based on detecting a visual cue 215 from the target vehicle 106. For example, the classifier can be further trained with data known to represent various visual cues 215. Thus, in addition to identifying a vehicle in the sub-area 210, the classifier can output an identification of a target vehicle 106 based on a visual cue 215. Once trained, the classifier can accept as input host vehicle sensor 115 data, e.g., an image, and then provide as output for each of one or more respective regions of interest in the image, an identification of a target vehicle 106 based on detecting a visual cue 215 or that no target vehicle 106 is present in the respective region of interest based on detecting no visual cue 215.

A visual cue 215 is a visible signal output from the target vehicle 106 indicating the target vehicle 106 is departing the sub-area 210. The visual cue 215 is output via actuation of one or more target vehicle 106 components. For example, the visual cue 215 can be output by at least one of headlamps, taillights, back-up lights, and a turn signal. That is, the visual cue 215 can be activation of exterior lights, e.g., at least one of headlamps, taillights, back-up lights, and a turn signal, to an "on" state. As another example, the visual cue 215 can be movement of the target vehicle 106 towards the path P of the host vehicle 105, e.g., output via actuation of a propulsion component of the target vehicle 106.

Additionally or alternatively, the vehicle computer 110 can be programmed to identify the target vehicle 106 based further on the target vehicle 106 being within a first distance of the host vehicle 105. The first distance specifies a distance between the host vehicle 105 and the target vehicle 106 within which the vehicle computer 110 can identify the target vehicle 106. The first distance can be determined based on, e.g., empirical testing to determine a distance between the host vehicle 105 and a target vehicle 106 within which the vehicle computer 110 may alter operation of the host vehicle 105 to avoid a target vehicle 106 departing a sub-area 210. The first distance may be stored in the memory of the vehicle computer 110.

The vehicle computer 110 can determine a distance D between the host vehicle 105 and the target vehicle 106 based on sensor 115 data. For example, a lidar sensor 115 can emit a light beam and receive a reflected light beam reflected off an object, e.g., the target vehicle 106. The vehicle computer 110 can measure a time elapsed from emitting the light beam to receiving the reflected light beam. Based on the time elapsed and the speed of light, the vehicle computer 110 can determine the distance D between the host vehicle 105 and the target vehicle 106. The vehicle computer 110 can then compare the distance D to the first distance. In the case that the distance D is equal to or less than the first distance, the vehicle computer 110 can identify the target vehicle 106. In the case that the distance D is greater than the first distance, the vehicle computer 110 cannot identify the target vehicle 106.

Further, the vehicle computer 110 can compare the distance D between the host vehicle 105 and the target vehicle 106 to a second distance, e.g., stored in the memory of the vehicle computer 110. The second distance specifies a distance between the host vehicle 105 and the target vehicle 106 within which the vehicle computer 110 operates the host vehicle 105 along the path P. The second distance can be determined based on, e.g., empirical testing to determine a minimum distance at which the vehicle computer 110 can stop the host vehicle 105 to avoid impacting the target vehicle 106 (e.g., based on the speed of the host vehicle 105, the speed of the target vehicle 106, etc.). The second distance is within the first distance. In the case that the distance D between the host vehicle 105 and the target vehicle 106 is less than the second distance, the vehicle computer 110 operates the host vehicle 105 along the path P, e.g., from one side to the other side of the target vehicle 106 and the sub-area 210. In the case that the distance D between the host vehicle 105 and the target vehicle 106 is equal to or greater than the second distance and equal to or less than the first distance, the vehicle computer 110 operates the host vehicle 105 to the stop position S or along the updated path, as discussed below.

Upon identifying the target vehicle 106, the vehicle computer 110 can be programmed to update the path P of the host vehicle 105. For example, the vehicle computer 110 can update the path P to move the host vehicle 105 away from the target vehicle 106 (See FIG. 3A). For example, the vehicle computer 110 can determine one or more objects, e.g., parked vehicles, along the path P on the opposite side of the host vehicle 105 as the target vehicle 106. That is, the host vehicle 105 is between the one or more objects and the target vehicle 106. The vehicle computer 110 can then determine a lateral distance L (see FIG. 3A) from the host vehicle 105 to the one or more objects based on image data.

For example, the vehicle computer 110 can identify the lateral distance L based on determining edges of the objects from the image data. For example, semantic segmentation of the image data can be performed to identify features such as edges or boundaries, e.g., by providing images as input to a machine learning program and obtaining as output a specification of a range of pixel coordinates associated with a feature such as an edge of the object. By identifying a set of pixel coordinates in an image associated with an edge of the object, and determining a distance (in pixel coordinates) from an image sensor 115 lens to the identified object-edge pixel coordinates, the computer 110 can then determine a distance of a vehicle 105 sensor 115 lens from the edge of the object. That is, according to such techniques, the computer 110 can determine a distance from the lens to the identified coordinates (in pixel coordinates) and can further determine, from the image, an angle α between a line from the sensor 115 lens to the identified edge point and an axis extending from the lens parallel to a longitudinal axis A of the vehicle 105. Then, using trigonometric functions, the computer 110 can determine a length of a line drawn perpendicularly to the vehicle 105 longitudinal axis from the sensor 115 lens to a point on the edge of the object. The lateral distance L is the length of the line.

The vehicle computer 110 can then compare the lateral distance L to a third distance. The third distance specifies a distance between the host vehicle 105 and an object within which the vehicle computer 110 prevents operation of the host vehicle 105. The third distance can be determined based on, e.g., empirical testing to determine the minimum distance between the host vehicle 105 and an object at which the vehicle computer 110 can prevent the host vehicle 105 from impacting the object. The third distance may be stored in the memory of the vehicle computer 110. In the case that the lateral distance L is greater than the third distance, the vehicle computer 110 can update the path P of the host vehicle 105 towards the one or more objects. For example, the vehicle computer 110 can update the path such that the lateral distance L is equal to the third distance. That is, the host vehicle 105 is farther from the target vehicle 106 along the updated path as compared to the path P. In the case that the lateral distance L is less than or equal to the third distance, the vehicle computer 110 can maintain the path P of the host vehicle 105.

Additionally or alternatively, the vehicle computer 110 can be programmed to operate the host vehicle 105 at a speed below a speed threshold upon identifying the target vehicle 106. For example, the vehicle computer 110 can actuate one or more vehicle components 125, e.g., a brake component, a propulsion component, etc., to operate the host vehicle 105 at a speed below the speed threshold. The speed threshold specifies a maximum speed at which the vehicle computer 110 can operate the host vehicle 105 when a target vehicle 106 is departing a sub-area 210, e.g., based on the distance D from the target vehicle 106 to the host vehicle 105. The speed threshold can be determined based on, e.g., empirical testing to determine an amount of time for the vehicle computer 110 to stop the host vehicle 105 upon detecting target vehicles 106 departing sub-areas 210. The speed threshold can be stored in the memory of the vehicle computer 110.

The vehicle computer 110 can be programmed to identify target vehicle 106 parameters, e.g., dimensions (e.g., height, length, width), a turning radius, a wheelbase, etc. For example, the classifier can be further trained with data known to represent various types, e.g., makes and/or models, of vehicles. Thus, in addition to identifying the target vehicle 106, the classifier can output a type of the target vehicle 106. Once trained, the classifier can accept as input host vehicle sensor 115 data, e.g., an image including the target vehicle 106, and then provide as output an identification of the type of the target vehicle 106 in the image. As another example, the vehicle computer 110 can determine a type of the target vehicle 106 based on image data, e.g., by using image recognition techniques. The vehicle computer 110 can then determine one or more target vehicle 106 parameters based on the type of the target vehicle 106. For example, the vehicle computer 110 may store, e.g., in a memory, a look-up table or the like that associates target vehicle 106 parameters with a type of target vehicle 106.

The vehicle computer 110 can determine a travel direction of the target vehicle 106 based on image data. The travel direction of the target vehicle 106 is one of forward or backward relative to the path P of the host vehicle 105. For example, the vehicle computer 110 can identify exterior lights, e.g., headlamps, taillights, back-up lights, etc., on the target vehicle 106 based on image data including the target vehicle 106, e.g., using image recognition techniques, such as are known. In the case that the vehicle computer 110 identifies headlamps on the target vehicle 106 (e.g., facing the path P of the host vehicle 105), the vehicle computer 110 can determine the travel direction of the target vehicle 106 is forward relative to the path P of the host vehicle 105. In the case that the vehicle computer 110 identifies taillights and/or back-up lights (e.g., facing the path P of the host vehicle 105), the vehicle computer 110 can determine the travel direction of the target vehicle 106 is backward relative to path P of the host vehicle 105.

The vehicle computer 110 can be programmed to determine a turning direction of the target vehicle 106. For example, the vehicle computer 110 can determine the turning direction based on image data including the target vehicle 106, e.g., by using image recognition techniques. For example, the vehicle computer 110 can determine an angle between a line extending along the longitudinal axis of the host vehicle 105 and a line extending along the longitudinal axis of the target vehicle 106. If the angle is acute, then the vehicle computer 110 determines the turning direction is towards the host vehicle 105. If the angle is obtuse, then the vehicle computer 110 determines the turning direction is away from the host vehicle 105.

Additionally or alternatively, the vehicle computer 110 can detect actuation of one or more target vehicle 106 components based on image data including the target vehicle 106. For example, the vehicle computer 110 can detect activation of a turn signal on the target vehicle 106, e.g., based on output from the classifier, and can determine the turning direction based on the turn signal. As another example, the vehicle computer 110 can detect actuation of target vehicle 106 wheels, i.e., that the target vehicle 106 wheels are turned relative to the target vehicle 106 body, e.g., by using image recognition techniques. That is, the vehicle computer 110 can determine the turning direction of the target vehicle 106 based on the travel direction and the direction the target vehicle 106 wheels are turned relative to the target vehicle 106 body.

The vehicle computer 110 can predict whether a future location of the target vehicle 106 will intersect the path P of the host vehicle 105. The future location of the target vehicle 106 is defined at least in part by a predicted path of the target vehicle 106. For example, the vehicle computer 110 can predict a path of the target vehicle 106 based on the travel direction, turning direction, and target vehicle 106 parameters (e.g., turning radius, wheelbase, etc.), e.g., by using a conventional path planning algorithm. Alternatively, the target vehicle 106 can provide the path of the target vehicle 106 to the vehicle computer 110, e.g., via the network 135. The vehicle computer 110 can then compare the future location of the target vehicle 106 to the path of the host vehicle 105.

Upon predicting the target vehicle 106 future location will intersect the path P of the host vehicle 105, the vehicle computer 110 is programmed to determine a stop position S for the host vehicle 105 based on the future location of the target vehicle 106. The stop position S is a position along the updated path at which the vehicle computer 110 stops the host vehicle 105, i.e., actuates one or more vehicle components 125 to stop the host vehicle 105. The vehicle computer 110 determines the stop position S based on the future location of the target vehicle 106 (See FIGS. 3B and 3C). For example, the vehicle computer 110 can select a stop position S based on a distance between the stop position S and the future location of the target vehicle 106 being equal to or greater than a fourth distance. The fourth distance specifies a minimum distance from the future location of the target vehicle 106 to the stop position S. The fourth distance may be stored in the memory of the vehicle computer 110. The fourth distance may be determined based on, e.g., empirical testing to determine the minimum distance between the stop position S and the future location of the target vehicle 106 at which the target vehicle 106 can continue to operate towards the future location without stopping.

The vehicle computer 110 can determine the target vehicle 106 has moved toward the updated path of the host vehicle 105 based on sensor 115 data. For example, the vehicle computer 110 can determine the target vehicle 106 has moved toward the updated path of the host vehicle 105 based on a second lateral distance L2 between the host vehicle 105 and the target vehicle 106. For example, the vehicle computer 110 can determine the distance D from the host vehicle 105 to the target vehicle 106, as discussed above. The vehicle computer 110 can then determine, from image data, an angle θ between a line from the host vehicle 105 to the target vehicle 106 and an axis extending from the sensor 115 lens parallel to a longitudinal axis A of the host vehicle 105. Then, using trigonometric functions, the vehicle computer 110 can determine a length of a line drawn perpendicularly to the host vehicle 105 longitudinal axis from the sensor 115 lens to the target vehicle 106 (See FIG. 3B). The second lateral distance L2 is the length of the line. The vehicle computer 110 can determine the target vehicle 106 has moved toward the updated path of the host vehicle 105 based on the second lateral distance L2 being less than a previous second lateral distance.

As another example, the vehicle computer 110 can receive location data from the target vehicle 106, e.g., via the network 135. The vehicle computer 110 can compare a location of the target vehicle 106 to a previous location of the target vehicle 106 to determine the target vehicle 106 has moved toward the updated path of the host vehicle 105. For example, the vehicle computer 110 can determine a length T of a line from the location of the target vehicle 106 to the updated path of the host vehicle 105, and determine the target vehicle 106 has moved toward the updated path of the host vehicle 105 based on the length T being less than a previous length Tp (See FIG. 3C).

Upon determining the target vehicle 106 has not moved toward the updated path of the host vehicle 105, the vehicle computer 110 operates the host vehicle 105 along the updated path. For example, the vehicle computer 110 actuates one or more vehicle components 125 to move the host vehicle 105 along the updated path.

Upon determining the target vehicle 106 has moved toward the updated path of the host vehicle 105, the vehicle computer 110 is programmed to operate the host vehicle 105 to the stop position S. For example, the vehicle computer 110 can actuate one or more vehicle components 125 to move the host vehicle 105 to the stop position S. The stop position S may be in front of or behind a position of the host vehicle 105 when the vehicle computer 110 determines the target vehicle 106 has moved. That is, the vehicle computer 110 can move the host vehicle 105 forward or backward to the stop position S.

The vehicle computer 110 can determine the target vehicle 106 has stopped moving based on sensor 115 data. For example, the vehicle computer 110 can determine the target vehicle 106 has stopped moving based on comparing the location of the target vehicle 106 to the previous location of the target vehicle 106. Upon determining the location of the target vehicle 106 is the same as the previous location of the target vehicle 106, e.g., based on location data, image data, etc., the vehicle computer 110 can determine the target vehicle 106 stopped moving. As another example, the vehicle computer 110 can determine the target vehicle 106 has stopped moving based on the second lateral distance L2 being the same as the previous second lateral distance.

Upon determining the target vehicle 106 has stopped moving, the vehicle computer 110 determines the distance D between the target vehicle 106 and the host vehicle 105, as discussed above. The vehicle computer 110 can then initiate a timer specifying a threshold amount of time, i.e., a "time threshold." The time threshold can be determined as a function, e.g., a linear function, of the distance D between the target vehicle 106 and the host vehicle 105. For example, the time threshold may increase as the distance D decreases, i.e., the time threshold may be inversely proportional to the distance D. The vehicle computer 110 can operate the host vehicle 105 along the updated path based on detecting the target vehicle 106 remains stopped after a passage of the time threshold, i.e., upon expiration of the timer. In the case that the target vehicle 106 moves prior to the expiration of the timer, the vehicle computer 110 maintains the host vehicle 105 at the stop position S.

The vehicle computer 110 can determine the target vehicle 106 departed the sub-area 210 based on sensor 115 data. For example, the vehicle computer 110 can determine the target vehicle 106 departed the sub-area 210 based on comparing the location of the target vehicle 106 (e.g., received from the target vehicle 106, as discussed above) to a location of the sub-area 210, e.g., determined via a map of the area 200 (e.g., stored in a memory of the vehicle computer 110 and/or received from the server 140). As another example, the vehicle computer 110 can determine the target vehicle 106 departed the sub-area 210 based on determining the target vehicle 106 is outside of the boundaries of the sub-area 210 via image data, e.g., by using image or pattern recognition techniques to analyze image data including the target vehicle 106 and output a position of the target vehicle 106 relative to the boundaries of the sub-area 210.

Upon determining the target vehicle 106 departed the sub-area 210, the vehicle computer 110 can determine the distance D between the host vehicle 105 and the target vehicle 106, as discussed above. The vehicle computer 110 can then compare the distance D to a distance threshold. The distance threshold specifies a distance between the host vehicle 105 and the target vehicle 106 below which the vehicle computer 110 prevents operation of the host vehicle 105. The distance threshold can be determined based on, e.g., empirical testing to determine a minimum distance at which the vehicle computer 110 can prevent the host vehicle 105 from impacting other vehicles. The threshold can be stored in the memory of the vehicle computer 110. In the case that the distance D is equal to or greater than the distance threshold, the vehicle computer 110 can operate the host vehicle 105 along the updated path. In the case that the distance D is less than the distance threshold, the vehicle computer 110 can maintain the host vehicle 105 at the stop position S.

Additionally or alternatively, the vehicle computer 110 can determine a width W of a path around the target vehicle 106. For example, the vehicle computer 110 can determine the lateral distance L from the host vehicle 105 to one or more objects along the path P, as discussed above. Additionally, the vehicle computer 110 can determine the second lateral distance L2 from the host vehicle 105 to the target vehicle 106, as discussed above. The width W of the path can be determined by summing the lateral distance L and the second lateral distance L2 (See FIG. 3D). The second distance threshold specifies a minimum width of a path along which the vehicle computer 110 can operate the host vehicle 105. The second threshold can be stored in the memory of the vehicle computer 110. The second distance threshold can be the width of the host vehicle 105. In the case that the width W of the path around the target vehicle 106 is greater than the second distance threshold, the vehicle computer 110 can operate the host vehicle 105 along the updated path. In the case that the width W of the path around the target vehicle 106 is equal to or less than the second distance threshold, the vehicle computer 110 can maintain the host vehicle 105 at the stop position S.

Figure 4A:
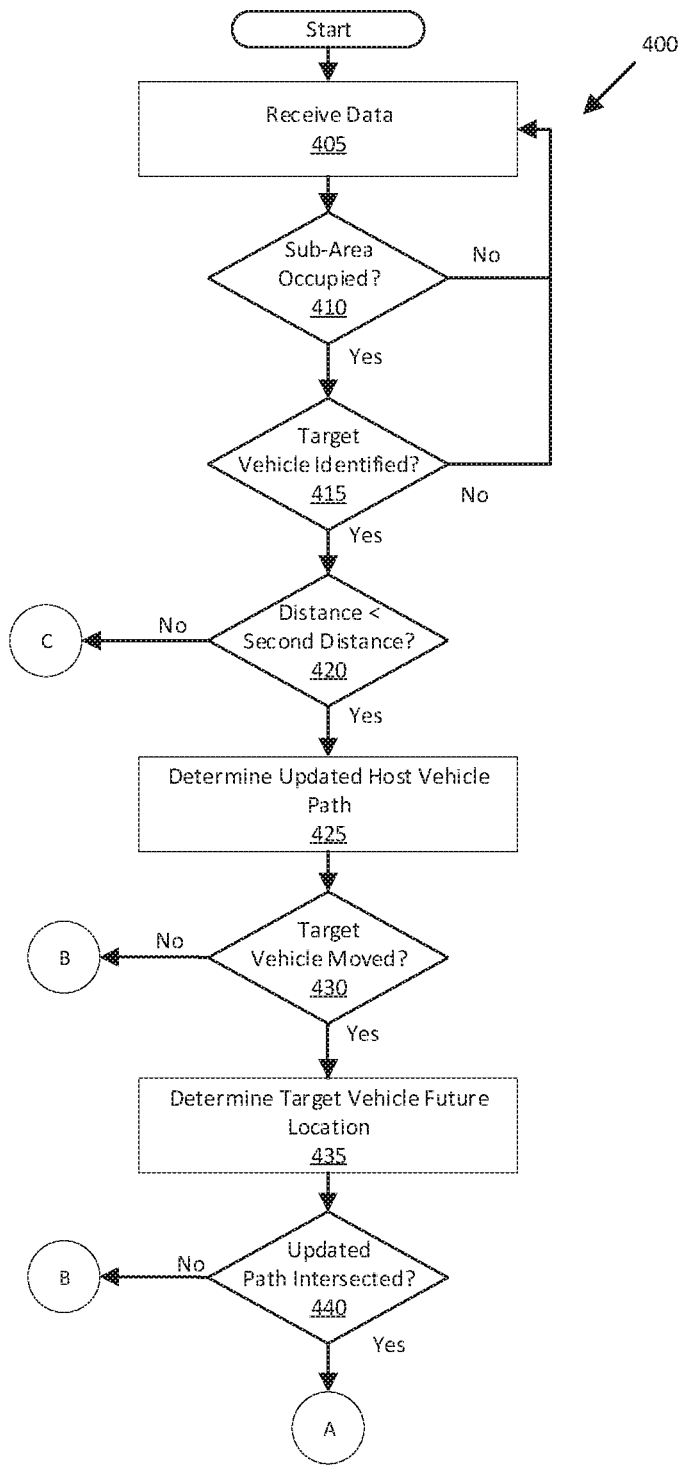
FIG. 4A is a first part of a flowchart of an example process for operating the host vehicle.

FIG. 4A is a first portion of a flowchart of an example process 400 (the second portion being shown in FIG. 4B because the entire flowchart will not fit on a single drawing sheet) for operating a host vehicle 105 in an area 200. The process 400 begins in a block 405.

In the block 405, a vehicle computer 110 receives sensor 115 data, e.g., image data, from one or more sensors 115, e.g., via the vehicle network, while the host vehicle 105 is operating in the area 200 (e.g., to search for a sub-area 210 such as a parking space). The image data includes the environment around the host vehicle 105, e.g., the area 200, one or more sub-areas 210, one or more objects, etc. The vehicle computer 110 operates the host vehicle along a path P in the area 200. The vehicle computer 110 can determine the path P, e.g., via navigation and/or path planning algorithms, as discussed above. The process 400 continues in a block 410.

In the block 410, the vehicle computer 110 determines whether a vehicle occupies a sub-area 210. For example, the vehicle computer 110 can identify the sub-area 210 using image recognition techniques, as discussed above. Upon identifying the sub-area 210, the vehicle computer 110 can determine that the identified sub-area 210 is occupied by a vehicle using object classification techniques, as discussed above. For example, the vehicle computer 110 can input image data into a classifier that is trained to output an identification of one or more objects or that no object is present in the sub-area 210, e.g., using a machine learning technique. If the classifier identifies an object in the sub-area 210 as a vehicle, then the process 400 continues in a block 415. If the classifier identifies the object in the sub-area 210 is not a vehicle or identifies that no object is present in the sub-area 210, then the process 400 returns to the block 405.

In the block 415, the vehicle computer 110 identifies the vehicle as a target vehicle 106 based on detecting a visual cue 215 from the target vehicle 106. As discussed above, the visual cue 215 is a visible signal output from the target vehicle 106 indicating the target vehicle is departing the sub-area 210. For example, the visual cue 215 can be output by at least one of headlamps, taillights, back-up lights, and a turn signal. That is, the visual cue 215 can be activation of exterior lights on the target vehicle 106. The vehicle computer 110 can detect the visual cue 215 using object classification techniques, as discussed above. For example, the classifier can be further trained to output an identification of a target vehicle 106 based on detecting a visual cue 215 or that no target vehicle 106 is present based on detecting no visual cue 215 in the image data.

Additionally, the vehicle computer 110 can identify the vehicle as a target vehicle 106 based on the vehicle being within a first distance (as discussed above) of the host vehicle 105. For example, the vehicle computer 110 can determine a distance D from the host vehicle 105 to the vehicle based on sensor 115 data, as discussed above, and then compare the distance D to the first distance. In the case that the distance D is less than or equal to the first distance, the vehicle computer 110 can identify the vehicle as a target vehicle 106. In the case that the distance D is greater than the first distance, the vehicle computer 110 cannot identify the vehicle as a target vehicle 106. If the vehicle computer 110 identifies a target vehicle 106 in the sub-area 210, then the process 400 continues in a block 420. If the vehicle computer 110 cannot identify a target vehicle 106 in the sub-area 210, then the process 400 returns to the block 405.

In the block 420, the vehicle computer 110 determines whether the host vehicle 105 is within a second distance (as discussed above) of the target vehicle 106. The second distance is within the first distance. Upon determining the distance D between the host vehicle 105 and the target vehicle 106, the vehicle computer 110 then compares the distance D to the second distance. If the distance D is greater than or equal to the second distance, then the process 400 continues in a block 425. If the distance D is less than the second distance, then the process 400 continues in a block 475.

In the block 425, the vehicle computer 110 determines an updated path of the host vehicle 105, e.g., using navigation and/or path planning algorithms, as discussed above. For example, the vehicle computer 110 can determine an updated path to move the host vehicle 105 away from the target vehicle 106. For example, the vehicle computer 110 can determine a lateral distance L (as discussed above) between the host vehicle 105 and objects along the path P and on the opposite side of the host vehicle 105 as the target vehicle 106. The vehicle computer 110 can then compare the lateral distance L to a third distance (as discussed above). In the case that the lateral distance L is greater than the third distance, the vehicle computer 110 can update the path P to make the lateral distance L equal to the third distance, i.e., to move the host vehicle 105 closer to the objects and away from the target vehicle 106. In the case that the lateral distance L is less than or equal to the third distance, the vehicle computer 110 maintains the path P of the host vehicle 105. The process 400 continues in a block 430.

In the block 430, the vehicle computer 110 determines whether the target vehicle 106 has moved toward the path P of the host vehicle 105, e.g., out of the sub-area 210. For example, the vehicle computer 110 can determine the target vehicle 106 has moved based on sensor 115 data. For example, the vehicle computer 110 can determine a second lateral distance L2 between the host vehicle 105 and the target vehicle 106 based on sensor 115 data, as discussed above. The vehicle computer 110 can then compare the second lateral distance L2 to a previous second lateral distance L2, e.g., stored in a memory of the vehicle computer 110. If the second lateral distance L2 is less than the previous second lateral distance L2, then the vehicle computer 110 determines the target vehicle 106 has moved toward the path of the host vehicle 105. If the second lateral distance L2 is equal to or greater than the previous second lateral distance L2, then the vehicle computer 110 determines the target vehicle 106 has not moved.

As another example, the target vehicle 106 can provide location data of the target vehicle 106 to the vehicle computer 110, e.g., via the network 135. The vehicle computer 110 can then compare the location data of the target vehicle 106 to previous location data of the target vehicle 106 to determine whether the target vehicle 106 has moved toward the path P of the host vehicle 105. If the target vehicle 106 has moved toward the path P of the host vehicle 105, then the process 400 continues in a block 435. Otherwise, the process 400 continues in a block 470.

In the block 435, the vehicle computer 110 determines a future location of the target vehicle 106. For example, the vehicle computer 110 can determine a travel direction of the target vehicle 106 based on sensor 115 data. As discussed above, the vehicle computer 110 can determine the target vehicle 106 is moving forward relative to the path P of the host vehicle 105 based on detecting headlamps via image data, and can determine the target vehicle is moving backward relative to the path P of the host vehicle 105 based on detecting tail lights and/or back-up lights via image data.

Additionally, the vehicle computer 110 can determine a turning direction of the target vehicle 106 based on sensor 115 data. For example, the vehicle computer 110 can determine an angle between the longitudinal axis of the target vehicle 106 and the longitudinal axis of the host vehicle 105 via image data, as discussed above. If the angle is acute, then the vehicle computer 110 determines the target vehicle 106 is turning towards the host vehicle 105. If the angle is obtuse, then the vehicle computer 110 determines the target vehicle is turning away from the host vehicle 105.

Additionally, the vehicle computer 110 can determine one or more target vehicle 106 parameters (e.g., turning radius, wheelbase, dimensions, etc.) of the target vehicle 106 based on object classification techniques, as discussed above. For example, the classifier can be further trained to output the type, e.g., make and model, of the target vehicle 106 based on the image data. The vehicle computer 110 can then determine one or more target vehicle 106 parameters based on the type of the target vehicle 106. For example, the vehicle computer 110 may store, e.g., in a memory, a look-up table or the like that associates target vehicle 106 parameters with a type of target vehicle 106.

Based on the turning direction, travel direction, and target vehicle 106 parameters, the vehicle computer 110 can determine a path of the target vehicle 106, e.g., using conventional path planning algorithms. Alternatively, the target vehicle 106 can provide a path of the target vehicle 106 to the vehicle computer 110, e.g., via the network. The vehicle computer 110 can then determine the future location of the target vehicle 106 based on the path. The process 400 continues in a block 440.

In the block 440, the vehicle computer 110 determines whether the future location of the target vehicle 106 will intersect the updated path of the host vehicle 105. For example, the vehicle computer 110 can compare the future location of the target vehicle 106 to the updated path of the host vehicle 105. As another example, the vehicle computer 110 can compare the path of the target vehicle 106 to the updated path of the host vehicle 105. If the future location of the target vehicle 106 intersects the updated path of the host vehicle 105, the process 400 continues in a block 445. Otherwise, the process 400 continues in the block 470.

Figure 4B:
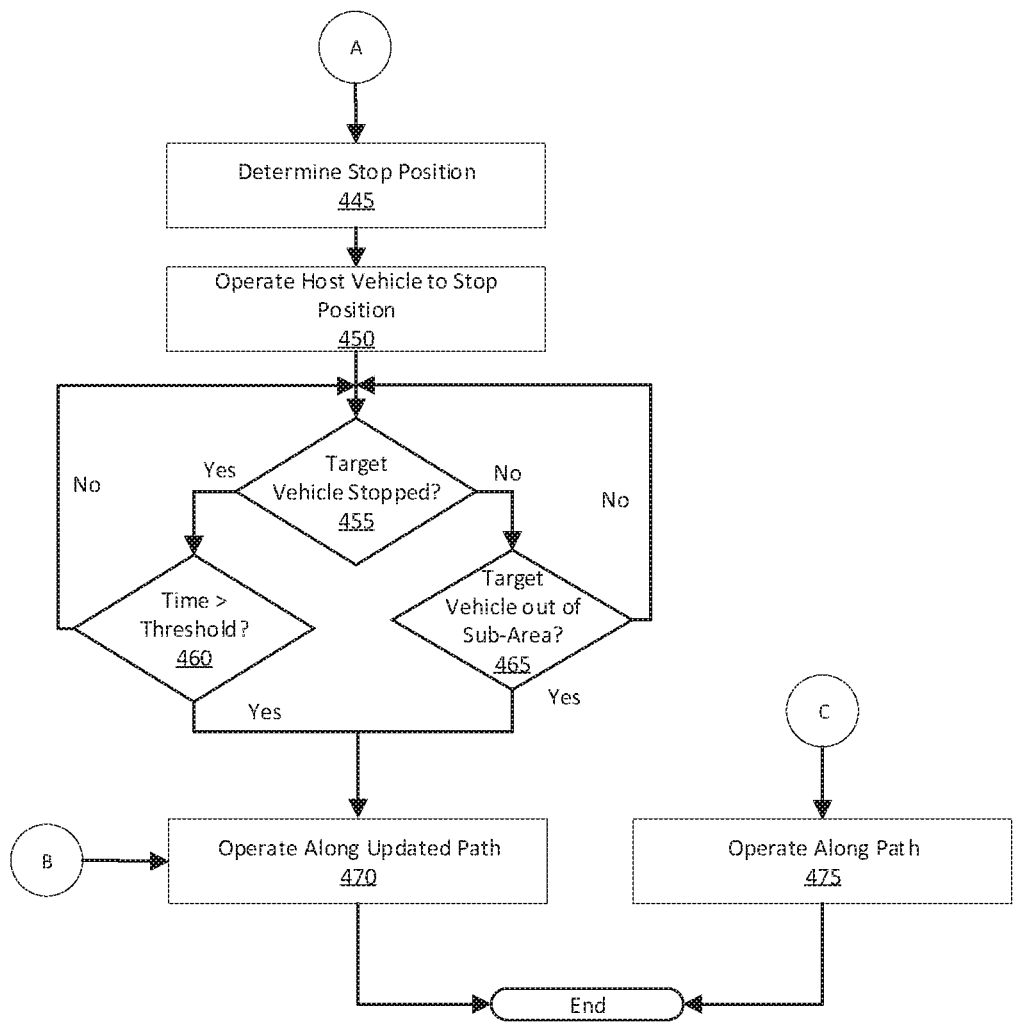
FIG. 4B is a second part of the flowchart of FIG. 4A.

Turning now to FIG. 4B, following the block 430 shown in FIG. 4A, in the block 445 the vehicle computer 110 determines a stop position S of the host vehicle 105. The stop position S is a position along the updated path at which the vehicle computer 110 stops the host vehicle 105, as discussed above. The vehicle computer 110 determines the stop position S based on the future location of the target vehicle 106. For example, the vehicle computer 110 can select a stop position S based on a distance between the stop position S and the future location of the target vehicle 106 being equal to or greater than a fourth distance, e.g., stored in a memory of the vehicle computer 110. The process 400 continues in a block 450.

In the block 450, the vehicle computer 110 operates the host vehicle 105 to the stop position S. For example, the vehicle computer 110 actuates one or more vehicle components 125 to stop the host vehicle 105 at the stop position S. The process 400 continues in a block 455.

In the block 455, the vehicle computer 110 determines whether the target vehicle 106 has stopped moving. For example, the vehicle computer 110 can determine the target vehicle has stopped moving based on sensor 115 data. For example, the vehicle computer 110 can determine the second lateral distance L2 from the target vehicle 106 to the host vehicle 105, as discussed above. The vehicle computer 110 can determine the target vehicle 106 has stopped based on the second lateral distance L2 being the same as the previous second lateral distance L2. As another example, the vehicle computer 110 can receive location data of the target vehicle 106 from the target vehicle 106, e.g., via the network 135.

The vehicle computer 110 can then determine the target vehicle 106 has stopped based on comparing the location data to previous location data. If the target vehicle 106 has stopped moving, the process 400 continues in a block 460. Otherwise, the process 400 continues in a block 465.

In the block 460, the vehicle computer 110 determines whether the target vehicle 106 has moved within a specified threshold amount of time. For example, the vehicle computer 110 determines the distance D between the target vehicle 106 and the host vehicle 105, as discussed above, upon determining the target vehicle 106 has stopped. The vehicle computer 110 then determines the threshold amount of time (i.e., "time threshold") based on the distance D between the target vehicle 106 and the host vehicle 105, as discussed above. The vehicle computer 110 then initiates a timer that has a duration equal to the time threshold. The vehicle computer 110 can detect that the target vehicle 106 has moved based on sensor 115 data, as discussed above. If the target vehicle 106 moves prior to the expiration of the timer, then the process 400 returns to the block 455. If the target vehicle 106 does not move prior to the expiration of the timer, then the process 400 continues in the block 470.

In the block 465, the vehicle computer 110 determines whether the target vehicle 106 is out of the sub-area 210. For example, the vehicle computer 110 can determine the target vehicle 106 is out of the sub-area 210 based on image data, e.g., using image recognition techniques to determine the target vehicle 106 is outside a boundary of the sub-area 210. As another example, the vehicle computer 110 can compare location data of the target vehicle 106 (e.g., received from the target vehicle 106 via the network 135) to location data of the sub-area 210 (e.g., determined based on a map stored in the memory of the vehicle computer 110). In the case that the vehicle computer 110 determines that the target vehicle 106 is out of the sub-area 210, the process continues in a block 470. In the case that the vehicle computer 110 determines that, e.g., at least a portion of, the target vehicle 106 remains in the sub-area 210, the process 400 returns to the block 455.

In the block 470, the vehicle computer 110 operates the host vehicle 105 along the updated path. The vehicle computer 110 actuates one or more vehicle components 125 to move the host vehicle 105 along the updated path. For example, following the block 460, the vehicle computer 110 can operate the host vehicle 105 along the updated path around, i.e., from one side to the other side of, the target vehicle 106 and the sub-area 210.

As another example, following the block 465, the vehicle computer 110 can operate the host vehicle 105 along the updated path based on the distance D between the target vehicle 106 and the host vehicle 105 being equal to or greater than a threshold distance (as discussed above). For example, the vehicle computer 110 can determine the distance D between the target vehicle 106 and the host vehicle 105, as discussed above. The vehicle computer 110 can then compare the distance D to the threshold distance. If the distance D is less than the threshold distance, the vehicle computer 110 can maintain the host vehicle 105 at the stop position S. Otherwise, the vehicle computer 110 can operate the host vehicle 105 along the updated path.

Additionally or alternatively, the vehicle computer 110 can operate the host vehicle 105 along the updated path based on a width W of a path around the target vehicle 106 being above a second distance threshold (as discussed above). For example, the vehicle computer 110 can determine the lateral distance L and the second lateral distance L2, as discussed above. The vehicle computer 110 can then determine the width W of the path based on a sum of the lateral distance L and the second lateral distance L2. The vehicle computer 110 can then compare the width W to the second distance threshold. If the width W is less than or equal to the second distance threshold, then the vehicle computer 110 can maintain the host vehicle 105 at the stop position. Otherwise, the vehicle computer can operate the host vehicle 105 along the updated path. The process 400 ends following the block 470.

In the block 475, the vehicle computer 110 operates the host vehicle 105 along the path P. For example, the vehicle computer 110 actuates one or more vehicle components 125 to move the host vehicle 105 along the path P, e.g., from one side to the other side of the target vehicle 106 prior to the target vehicle 106 departing the sub-area 210. That is, the vehicle computer 110 can operate the host vehicle 105 around the target vehicle 106 in the sub-area 210. The process 400 ends following the block 475.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. The adjectives "first," "second," "third," and "fourth," are used throughout this document as identifiers and are not intended to signify importance or order. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
    while operating a host vehicle in an area, identify a target vehicle in a sub-area based on detecting a visual cue from the target vehicle;
    predict that a future location of the target vehicle and a path of the host vehicle will intersect;
    determine a stop position of the host vehicle based on the future location of the target vehicle;
    update the path of the host vehicle to include a width of the path that satisfies a minimum width threshold, wherein the width of the path is determined by summing a first lateral distance from the host vehicle to an object and a second lateral distance from the host vehicle to the target vehicle; and
    then, operate the host vehicle to the stop position or along the updated path.

2. The system of claim 1, wherein the instructions further include instructions to identify the target vehicle based further on the target vehicle being within a first distance of the host vehicle.

3. The system of claim 2, wherein the instructions further include instructions to operate the host vehicle along the path based on the target vehicle being within a second distance of the host vehicle, wherein the second distance is less than the first distance.

4. The system of claim 1, wherein the instructions further include instructions to, upon determining that the target vehicle has stopped, operate the host vehicle along the updated path based on detecting the target vehicle remains stopped after a passage of a specified time.

5. The system of claim 4, wherein the instructions further include instructions to determine the specified time based on a distance between the stopped target vehicle and the host vehicle.

6. The system of claim 1, wherein the instructions further include instructions to, upon identifying the target vehicle, operate the host vehicle at a speed below a threshold.

7. The system of claim 1, wherein the instructions further include instructions to input host vehicle sensor data into a machine learning program that is programmed to output an identification of the target vehicle.

8. The system of claim 1, wherein the future location is defined in part by a path of the target vehicle.

9. The system of claim 8, wherein the instructions further include instructions to predict the path of the target vehicle based on a travel direction of the target vehicle and a turning direction of the target vehicle.

10. The system of claim 9, wherein the instructions further include instructions to determine the travel direction of the target vehicle based on identifying one of headlamps or taillights of the target vehicle via sensor data.

11. The system of claim 9, wherein the instructions further include instructions to determine the turning direction of the target vehicle based on detecting actuation of one or more target vehicle components.

12. The system of claim 9, wherein the instructions further include instructions to determine the turning direction of the target vehicle based on determining an angle between a longitudinal axis of the host vehicle and a longitudinal axis of the target vehicle.

13. The system of claim 1, wherein the instructions further include instructions to determine the stop position based on a distance from the stop position to the future location being equal to or greater than a specified distance.

14. The system of claim 1, wherein the visual cue is output by at least one of headlamps, taillights, back-up lights, and a turn signal.

15. A method comprising:
    while operating a host vehicle in an area, identifying a target vehicle in a sub-area based on detecting a visual cue from the target vehicle;
    predicting that a future location of the target vehicle and a path of the host vehicle will intersect;
    determining a stop position of the host vehicle based on the future location of the target vehicle;
    updating the path of the host vehicle to include a width of the path that satisfies a minimum width threshold, wherein the width of the path is determined by summing a first lateral distance from the host vehicle to an object and a second lateral distance from the host vehicle to the target vehicle; and
    then, operating the host vehicle to the stop position or along the updated path.

16. The method of claim 15, further comprising identifying the target vehicle based further on the target vehicle being within a first distance of the host vehicle.

17. The method of claim 15, further comprising determining the stop position based on a distance from the stop position to the future location being equal to or greater than a specified distance.

18. The method of claim 15, further comprising, upon determining that the target vehicle has stopped, operating the host vehicle along the updated path based on detecting the target vehicle remains stopped after a passage of a specified time.

* * * * *